March 7, 1933.    E. J. MADDEN    1,900,511
BRAKE OPERATING TUBE
Filed Feb. 14, 1929
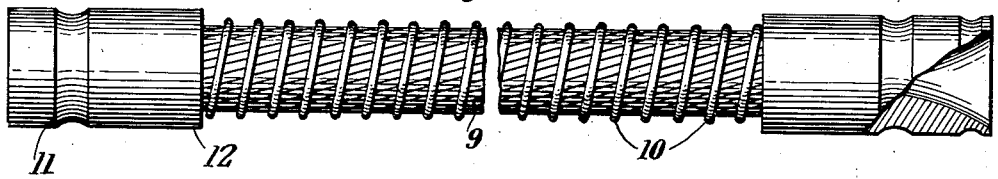
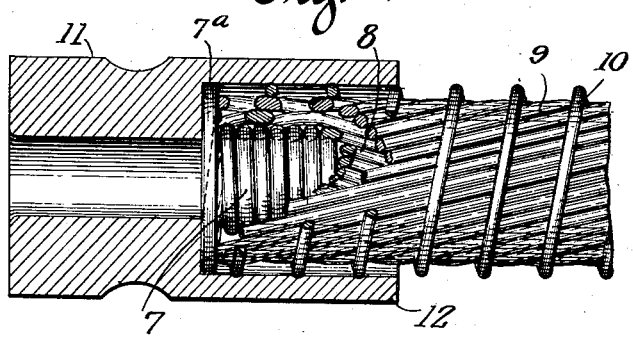
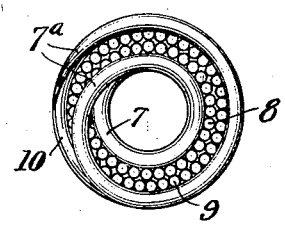
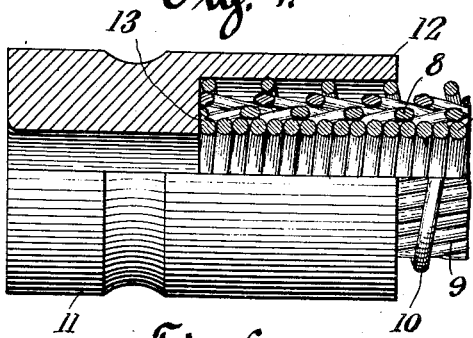
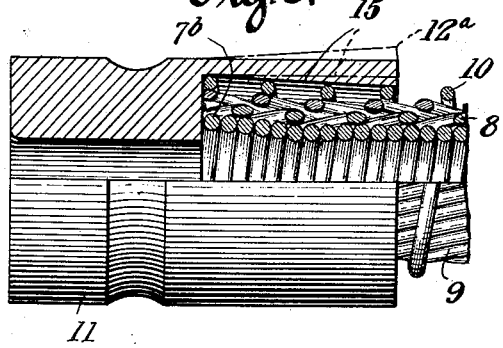
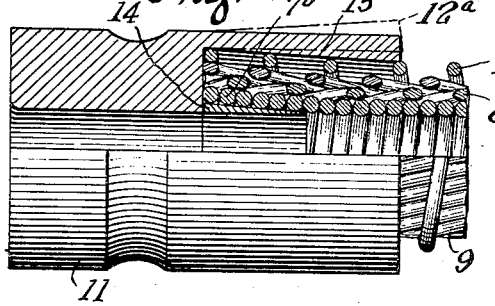
INVENTOR
Edward J. Madden
BY
ATTORNEY Patented Mar. 7, 1933

1,900,511

UNITED STATES PATENT OFFICE

EDWARD J. MADDEN, OF BRIDGEPORT, CONNECTICUT

BRAKE OPERATING TUBE

Application filed February 14, 1929. Serial No. 339,878.

This invention relates to the so-called brake operating tubes used in mechanical four-wheel brakes.

As now constructed, these tubes are made up of an inner helical coil of wire overlaid by crossed layers of wire, which are covered by an outer helical coil. The ends of these tubes are protected by ferrules which form the end mountings for the tubes. Usually, these ferrules are attached by squeezing them in a hydraulic press over the ends of the tubes. Frequently in squeezing these ferrules on the tubes, the ends of the inner coil slip back into the tube or are forced back, in the squeezing operation, leaving the ferrules insecurely attached and leaving the inner cable guiding coil in condition so it will not guide the cable where it has slipped back into the ends of the tube.

It is the purpose of this invention to avoid the objections noted and to provide a construction in which the ferrules will be securely and positively interlocked with the tubing and the inner guiding coil will be held against any possibility of slipping back into the tubing.

These objects are attained in part by first securing the ends of the inner coil at the ends of the tubing before the ferrules are placed over the ends of the tubing and then clamping the ferrules solidly down on to the tubing while the ends of the inner coil are thus fixedly held in position.

Various other novel features of the invention will appear as the specification proceeds.

The drawing accompanying and forming part of this invention illustrates several of the preferred embodiments of the invention, but it should be understood that the structure may be modified as regards these particular disclosures without departure from the true spirit and broad scope of the invention.

Fig. 1 is a broken longitudinal and part sectional view of the tube. Fig. 2 is an enlarged broken sectional view illustrating a form of fastening the inside coil by expanding it to lie against the end of the crossed layers of wire. Fig. 3 is an end view showing the inner coil expanded against the end of the double layer of wires. Fig. 4 is a broken sectional view showing the end of the inner coil anchored by welding, brazing or soldering to the surrounding wire layers. Fig. 5 is a similar view showing the inner coil expanded in conical form against the surrounding wire layers and these gripped by the end sleeve or ferrule contracted thereon. Fig. 6 is a like view illustrating the same result effected by inserting an expanding cone in the end of the inner coil.

The tubing shown consists of an inner helical coil of wire 7, surrounded by two layers of wire, 8, 9, laid with reverse twist and an outside coil 10, binding the whole together. This structure provides a strong, durable guide and support for the brake operating cable or connection, adapted to flex as required practically without changing in length.

This tubing is usually made up in continuous length and then soldered or banded where it is to be cut off in the shorter lengths. When cut, there is a tendency for the inner coil to shrink back into the ends of the tubing, which effect is increased when the end ferrules are squeezed into position over the ends of the tubing. The result in many cases is that due to the lack of support at the center, the outer layer of the tubing is gripped only superficially by the ferrules, which then permit the tubing to work loose, throwing the brake operation out of true. Another result is that the brake cable is left without a guide where it enters the ferrules and consequently chafes against the ends of the ferrules.

In the first embodiment of this invention, Figs. 2 and 3, an end turn or turns 7a, of the inside coil is or are unwound and opened out to larger diameter so as to lie against the ends of the crossed layers of wire, which then serve as an abutment positively preventing the end of the coil from retreating within the body of the tubing. While not necessary, the end of the inner coil, for greater security, may be expanded to the full outside diameter of the tubing, as shown. With the ends of the inner coil so held, the end ferrules, indicated at 11, may be contracted on the tubing with assurance that they will positively interlock with the tubing structure. The skirt or flange portions 12 of the ferrules may be swaged or contracted in a hydraulic press. With the ends of the inside coil anchored as described, this coil becomes in effect an anvil, solid enough to cause the portions 12 and the crossed or overlaid sections of wire to "bite" into each other and interlock by a "notching" action. Consequently the wires and the ferrules are mechanically interlocked and the tubing is actually strengthened and reinforced at the ferrules, where the greatest strain comes. In this interlocking and "solidifying" action the expanded ends of the inside, guide coil are permanently locked in their anchoring position just outside the ends of the tubing body by the surrounding, enclosing portions of the ferrules.

The ends of the inner coil may be withdrawn and expanded automatically or by hand, any suitable tool by which the end turns can be gripped and then be unwound to expand them being practical for the purpose.

In the second form of the invention, illustrated in Fig. 4, the fastening of the ends of the guide coil at the ends of the tubing is effected by welding, brazing or soldering the end turns of the coil to adjoining portions of the surrounding layer of wire as indicated at 13. With the ends of the coil thus held the sleeves or ferrules can be compressed solidly and permanently onto the tubing, as before described.

In Figs. 5 and 6 the ends of the inside coil are shown as expanded in conical form at 7b, inside, instead of beyond the end of the tubing, the body of the tubing, by the same expanding tool being similarly flared to serve the effect of a shoulder or abutment for holding the coil. As indicated in Fig. 6 the expanding tool may be a taper sleeve 14 driven into the end of the tubing and left there to become a permanent part bracing the end portion of the coil and aiding in the interlock between the ferrule and tubing.

The broken lines in Figs. 5 and 6 illustrate how the end ferrules or fittings 11, may be made with a cylindrical socket 15, large enough to receive the fully expanded end of the tubing and with a flaring or thickened skirt 12a, which when compressed down to the cylindrical form, shown in full lines, firmly and positively grips and interlocks on the tubing.

The anchorage of the inner coil so that it can not slip back into the tubing insures that the ferrules wi'l be permanently locked in position on the tubing and that the coil will properly guide the brake cable at the junction of the tubing with the ferrule.

What is claimed is:

1. An operating tube for brake connections, comprising an inner helical wire coil, wire layers overlaid in reversely twisted relation about said inner coil, a helical wire coil about said reversely laid wire layers, the end of said inner coil being fastened to and supported by the end portion of the overlying wire layers, an end ferrule socketed to fit over the entire end portion of the tubing structure, said ferrule having a portion compressed upon the outer coil and binding said outer coil upon the overlying layers and the secured end portion of the inner coil, the end of the inner coil being secured by having its end portion drawn out and expanded to a larger diameter over the end of the overlying wire layers and said expanded portion of the inner coil being held by the socket in the ferrule solidly against the end of the overlying wire layers.

2. An operating tube for brake connections, comprising an inner helical wire coil, a plurality of wires laid in reversely twisted relation about said inner coil, a helical wire coil about said lays of wire, the end portions of said inner coil being expanded in substantially cone shape thereby preventing the retreat of said end portions into said tube.

3. An operating tube for brake connections, comprising inner and outer helical coils with interposed lays of wire, cone shape metal sleeves seated in the ends of said coil, the end portions of said inner coil being expanded in a substantially cone shape to accommodate said cone shape metal sleeves and metal ferrules adapted to be positioned over and about the end portions of said outer coil the metal of which is impacted into the interstices of said outer coil, said coil gripping in turn said intervening lays, said lays in turn gripping said inner coil, said inner coil in turn being forced into said metal sleeve forming thereby an integral structure.

In testimony whereof I affix my signature.

EDWARD J. MADDEN.